(12) United States Patent
Kakinoki et al.

(10) Patent No.: US 10,067,271 B2
(45) Date of Patent: Sep. 4, 2018

(54) OPTICAL SHEET AND METHOD FOR MANUFACTURING SAME

(71) Applicants: MITSUBISHI GAS CHEMICAL COMPANY, INC., Tokyo (JP); MGC FILSHEET CO., LTD., Saitama (JP)

(72) Inventors: Osamu Kakinoki, Tokyo (JP); Masahide Takeda, Tokyo (JP); Shotaro Ohno, Tokyo (JP); Takeshi Onishi, Fukushima (JP); Masataka Sugiyama, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 15/514,348

(22) PCT Filed: Sep. 29, 2015

(86) PCT No.: PCT/JP2015/077451
§ 371 (c)(1),
(2) Date: Mar. 24, 2017

(87) PCT Pub. No.: WO2016/052475
PCT Pub. Date: Apr. 7, 2016

(65) Prior Publication Data
US 2017/0285226 A1    Oct. 5, 2017

(30) Foreign Application Priority Data

Oct. 2, 2014 (JP) ................................ 2014-204352

(51) Int. Cl.
*G02B 6/10* (2006.01)
*G02B 5/02* (2006.01)
(Continued)

(52) U.S. Cl.
CPC ............... *G02B 5/021* (2013.01); *B29D 7/01* (2013.01); *B32B 7/06* (2013.01); *B32B 2307/40* (2013.01); *G02B 1/04* (2013.01)

(58) Field of Classification Search
CPC .. G02B 5/021; G02B 1/04; B29D 7/01; B32B 7/06; B32B 2307/40
See application file for complete search history.

(56) References Cited

U.S. PATENT DOCUMENTS

| 2006/0228092 A1 | 10/2006 | Hebrink et al. |
| 2010/0075069 A1 | 3/2010 | Laney et al. |
| 2012/0092756 A1* | 4/2012 | Yoshida ................... E06B 9/24 359/351 |

FOREIGN PATENT DOCUMENTS

| JP | 10-156944 | 6/1998 |
| JP | 2002-103410 A | 4/2002 |

(Continued)

*Primary Examiner* — Ellen Kim
(74) *Attorney, Agent, or Firm* — Greenblum & Bernstein, P.L.C.

(57) ABSTRACT

An optical sheet is formed by laminating, by co-extrusion molding, a first layer containing a polycarbonate resin, a second layer containing a polyamide resin, and a third layer, wherein the second layer is laminated between the first layer and the third layer, the first layer and second layer, and the second layer and third layer can each be peeled at the interface, and the outer surface of the first layer has a fine grooved structure. The optical sheet, which is provided with a plurality of layers in such a way, is capable of retaining, a sufficient amount of heat in a laminate in a mold since the entire sheet can be made thick during melt extrusion molding, and is able to improve the transferability of the fine grooved structure. In addition, the optical sheet can be made thinner by using only the peeled first layer as an optical sheet.

15 Claims, 2 Drawing Sheets

(51) Int. Cl.
*B29D 7/01* (2006.01)
*B32B 7/06* (2006.01)
*G02B 1/04* (2006.01)

(56) References Cited

FOREIGN PATENT DOCUMENTS

| | | |
|---|---|---|
| JP | 2008-537792 | 9/2008 |
| JP | 2010-134429 | 6/2010 |
| JP | 2012-066410 | 4/2012 |
| JP | 2012-171260 | 9/2012 |
| WO | 2014/163067 | 10/2014 |

\* cited by examiner

OPTICAL SHEET AND METHOD FOR MANUFACTURING SAME

TECHNICAL FIELD

The present invention relates to an optical sheet and a method for manufacturing the same. The optical sheet of the present invention can preferably be used for enhancing luminance and improving viewing angles of various display devices including television, and various display devices for, for example, lighting equipments and digital signage.

BACKGROUND ART

When a thermoplastic resin sheet is molded by melt extrusion, a cooling/shaping roll that has a fine grooved structure on its surface is often used to transfer said fine grooved structure onto the sheet surface, thereby imparting various functions onto the surface of the molded sheet made from the thermoplastic resin. For example, a roll having a fine prism structure on its surface is used to transfer said prism structure onto a sheet to manufacture a highly functional luminance enhancement sheet by melt extrusion molding.

In order to mold such a sheet by melt extrusion, generally, a sheet of a molten thermoplastic resin that flows out from a lip part of a T-die or a coat-hanger die is pressed between a cooling/shaping roll having a fine grooved structure on its surface and a press roll. In general, the thinner the sheet is, the more the transfer property of the fine grooved structure is likely to deteriorate. This is, for example, because a sheet-like molten resin is easily cooled in a region called "air gap" between the die lip and the roll pressing part (the part between the cooling/shaping roll and the press roll where pressing takes place), and also the sheet-like molten resin is solidified relatively fast at the roll pressing part due to heat transfer to the cooling/shaping roll.

In order to enhance the transfer property onto a thin sheet manufactured by melt extrusion molding, attempts such as raising the set temperatures of the die and the roll, and raising the pressing pressure have been made. However, if the set temperatures of the die and the roll are too high, the thermoplastic resin is not sufficiently solidified and cooled as the sheet is pressed between the cooling/shaping roll and the press roll and peeled off from the cooling/shaping roll. As a result, the molded sheet sticks to the cooling/shaping roll, causing an appearance defect called peel marks. Accordingly, there is a limit to raising the set temperatures of the die and the roll. In addition, if the pressing pressure is raised too much, roll bending occurs due to lack of roll rigidity which results in defects such as difficulty in controlling the film thickness of the molded sheet or difficulty in uniform transfer.

As a method for manufacturing a shape-transferred optical sheet by melt extrusion molding, Japanese Unexamined Patent Application Publication No. 2012-66410 describes a method comprising a step of laminating a first layer made of an easily peelable protection film and a second layer made of a film with an optical shape by a coextrusion method, wherein the first layer made of the protection film is made from a polyethylene-based resin or a polypropylene-based resin while the optical shape of the second layer is formed on the surface that does not make contact with the first layer made of the protection film.

PRIOR ART DOCUMENT

Patent Document

Patent Document 1: Japanese Unexamined Patent Application Publication No. 2012-66410

SUMMARY OF INVENTION

Problems to be Solved by Invention

The method for manufacturing an optical sheet according to Japanese Unexamined Patent Application Publication No. 2012-66410 mainly aims at preventing scratch caused by rubbing between the front and rear surfaces of the rolled optical sheet, and mentions, as secondary effects, enhancement of the handling property, cost reduction, imparting a matte pattern on the rear surface of the optical sheet and else. However, it does not intend to enhance the transfer property of a fine grooved structure upon melt extrusion molding. Moreover, since the first layer made of the protection film is made from a polyethylene-based resin or a polypropylene-based resin, if these resins have crystallinity, warpage (curl) is likely to occur due to the difference in the volume shrinkages between the layers upon cooling solidification, causing the first layer and the second layer to peel off from each other against the intention. Moreover, since the molding temperatures of these resins are basically low, if the set temperature of a die or the like is raised in order to increase the transfer rate of the fine grooved structure, decomposition of the resin and the like occurs, causing adverse effects on the appearance of the sheet. Specifically, if a resin such as a polycarbonate resin, namely, an amorphous polar polymer material with a very high molding temperature is used as a material of one layer, it is extremely difficult to use a polyolefin resin, namely, a nonpolar polymer material with relatively low molding temperature and high crystallinity, as a mating member (the material of the other layer) of the two-layer structure.

Thus, the objectives of the present invention are to provide a method for manufacturing an optical sheet which is capable of preventing warpage of the sheet and the adverse effects on the appearance that are caused upon melt extrusion molding and which can sufficiently enhance the transfer property of the fine grooved structure, and to provide a highly functional optical sheet that has good appearance without warpage and that has deeper groove depth with respect to the sheet thickness.

Means to Solve Problem

The present invention is as follows.
(1) An optical sheet obtained by laminating a first layer comprising a polycarbonate resin, a second layer comprising a polyamide resin and a third layer by coextrusion molding, wherein:
the second layer is laminated between the first layer and the third layer;
the first layer and the second layer, and the second layer and the third layer are peelable at their interfaces, respectively; and
a fine grooved shape is formed on the outer surface of the first layer.
(2) The optical sheet according to (1) above, wherein the third layer comprises a polycarbonate resin.
(3) The optical sheet according to (2) above, wherein the first layer and the third layer are formed of the same material.

(4) The optical sheet according to any one of (1) to (3) above, wherein a fine grooved shape is also formed on the outer surface of the third layer as well as the outer surface of the first layer.
(5) The optical sheet according to any one of (1) to (4) above, wherein a fine grooved shape is formed at the interface between the first layer and the second layer and/or the interface between the second layer and the third layer.
(6) The optical sheet according to any one of (1) to (5) above, wherein the thickness of the first layer is in a range of 30-250 µm.
(7) The optical sheet according to any one of (1) to (6) above, wherein the polyamide resin contained in the second layer is a crystalline polyamide resin.
(8) The optical sheet according to any one of (1) to (7) above, wherein the polyamide resin contained in the second layer is an amorphous polyamide resin, and the difference between the glass transition temperature of the polycarbonate resin contained in the first layer and the glass transition temperature of the amorphous polyamide resin contained in the second layer is within a range of ±40° C.
(9) The optical sheet according to any one of (1) to (8) above, wherein the melt viscosity ratio of the polycarbonate resin contained in the first layer and the polyamide resin contained in the second layer at 260° C. is in a range of 1:5 to 5:1 at a shear rate of 100 $s^{-1}$.
(10) The optical sheet according to any one of (1) to (9) above, wherein the peel strength between the first layer and the second layer according to a 180-degree peel test, and/or the peel strength between the third layer and the second layer according to a 180-degree peel test is in a range of 1-100 N/m when the testing rate is 150 mm/min and the thickness of the sheet layer held by a clamp and run is 50-150 µm.
(11) The optical sheet according to any one of (1) to (10) above, wherein the fine grooved shape is any one of a matte finish shape, a prism shape and a microlens shape.
(12) The optical sheet according to (1) above, wherein the third layer comprises a resin selected from polyethylene, polyvinyl chloride, polyvinylidene chloride, polylactic acid, polypropylene, polycarbonate, polytetrafluoroethylene, polyurethane, polystyrene, an ABS resin, an acrylic resin, a polyacetal resin, a polyester, nylon, aramid, polyamide, an acrylonitrile styrene resin (AS resin) and a cyclo-olefin polymer (COP).
(13) A method for manufacturing an optical sheet comprising a step of making a first layer comprising a polycarbonate resin, a second layer comprising a polyamide resin and a third layer into a sheet by coextrusion molding such that the second layer is laminated between the first layer and the third layer, wherein a fine grooved shape is provided onto the outer surface of the first layer by sandwiching the laminated body of the three layers which are the first layer, the second layer and the third layer, under pressure between a cooling/shaping roll having the fine grooved structure on its surface and a press roll.
(14) The method for manufacturing an optical sheet according to (13) above, wherein the press roll is a rigid metal roll or an elastic metal roll.
(15) A single-layer optical sheet comprising a polycarbonate resin, wherein a fine grooved shape is formed on at least one outer surface, the value of [average groove depth (µm) of optical sheet/thickness of optical sheet (µm)] is 0.0375 to 0.5, and the sheet thickness is 1-120 µm.
(16) The optical sheet according to (15) above, which is a continuous sheet manufactured by extrusion molding.

Effects of Invention

An optical sheet of the present invention is an optical sheet that is obtained by laminating a first layer comprising a polycarbonate resin, a second layer comprising a polyamide resin and a third layer by coextrusion molding, wherein: the second layer is laminated between the first layer and the third layer; the first layer and the second layer, and the second layer and the third layer are peelable at their interfaces, respectively; and a fine grooved shape is formed on the outer surface of the first layer. Since the total thickness of the optical sheet having these multiple layers can be made thick upon melt extrusion molding, i.e., upon transfer of the fine grooved structure, a sufficient amount of heat can be retained in the laminated body during molding so that rapid cooling of the resin is prevented in the air gap region and while being pressed between the rolls, thereby remarkably improving the transfer property of the fine grooved structure. Furthermore, since there is no need to set the temperature specially high upon molding in order to enhance the transfer rate, good appearance of the molded sheet can easily be maintained. In addition, since the first layer comprising the polycarbonate resin and the second layer comprising the polyamide resin can easily be separated from each other by peeling after the coextrusion molding, an eventually (i.e., by the peeling apart the laminated body) very thin optical sheet can be molded, in spite of the high transfer rate of the fine grooved structure. Furthermore, in a case where a set of cooling/shaping rolls each having a fine grooved structure on its surface are used for sandwiching a sheet under pressure, two optical sheets can be obtained from the first layer and the third layer through a single molding.

Additionally, since the polycarbonate resin and the polyamide resin have moderate peel strength, no peeling is caused at the interface during coextrusion molding for making them into a sheet. Moreover, if, for example, the polyamide resin is amorphous and the difference of the glass transition temperature from that of the polycarbonate resin is within ±40° C., the molding shrinkage can be made almost equal to that of the polycarbonate resin and thus problems such as warpage are not caused.

In addition, the resin of the second layer or the resins of the second and third layers that are used in order to increase the thickness of the laminated body upon coextrusion molding but are not used as the eventual optical sheet after being peeled off may be collected and reused. Accordingly, recycled materials of the polycarbonate resin and the polyamide resin may be used in the first place as the resin layers that are not utilized as the optical sheet.

Moreover, since recycled materials can be used as described above, the present invention is also capable of reducing the cost for manufacturing an optical sheet.

DESCRIPTION OF EMBODIMENTS

Figure 1:
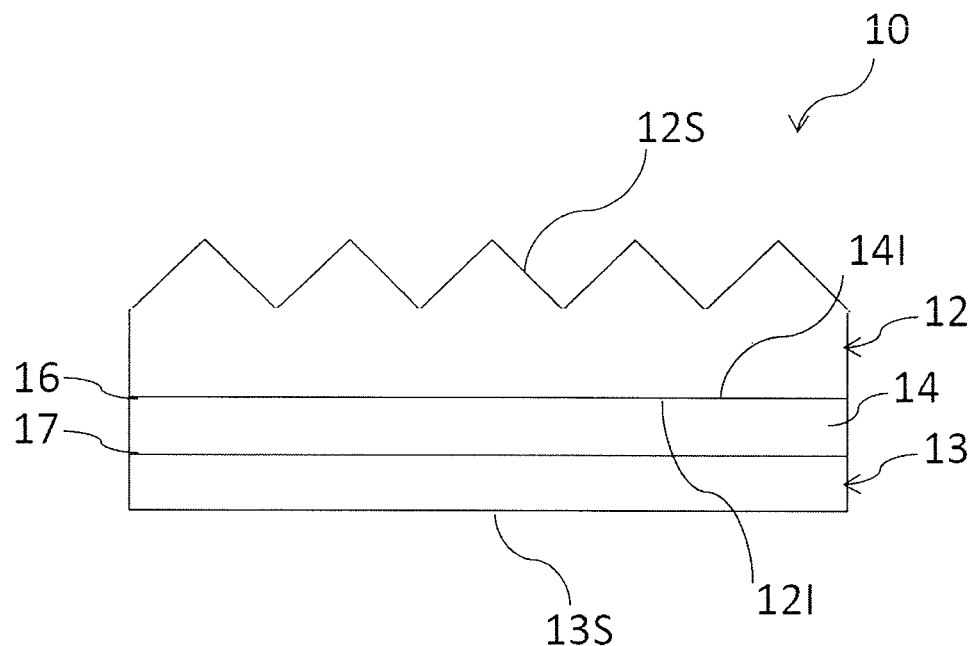
FIG. 1 A schematic cross-sectional view of an optical sheet according to a first embodiment of the present invention.

Hereinafter, the present invention will be described in more detail.

(I) Optical Sheet

According to the present invention, an ultra-thin optical sheet having a fine grooved structure transferred with high precision on its surface can be obtained by a melt extrusion molding method. In order to obtain such an ultra-thin optical sheet, a polycarbonate resin which will be described in detail below is used in combination with a polyamide resin, preferably a crystalline polyamide resin, an alloy of amorphous polyamides (a mixture of amorphous polyamides) or the like. Since a polycarbonate resin and a polyamide resin are both polar materials and have moderate adhesiveness, defect phenomenon such as peeling phenomenon during molding can be avoided as compared to a case where a resin of a nonpolar material with weak intermolecular force such as a polyolefin resin is used.

Furthermore, a polyolefin-based resin often has crystallinity and is extremely large in solidification shrinkage, when it is subjected to coextrusion molding with an amorphous material such as a polycarbonate resin, it is highly possible that warpage occurs such that the resulting sheet curls during molding or peeling at the interface occurs. Since a polyamide resin is used in an optical sheet of the present invention, the solidification shrinkage thereof is almost equal to that of the polycarbonate resin and thus occurrence of problems such as warpage can be avoided.

Moreover, since a polyolefin-based resin significantly differs from a polycarbonate resin in terms of molding temperature, coextrusion molding with the polycarbonate resin may often cause decomposition or gelation of the polyolefin-based resin. This tendency is particularly high for a copolymer material that has a second component and a third component added in order to reduce crystallinity of the polyolefin-based resin. In order to transfer a fine grooved structure on a sheet surface with high precision, the extrusion temperature of the polycarbonate resin needs to be raised. In the case of a polyolefin-based resin, however, the transfer property cannot be enhanced even when coextrusion molding is performed since there is a limit to the set temperature.

On the other hand, since a polyamide resin is used as a material for coextruding with a polycarbonate resin in an optical sheet of the present invention, the molding temperature region is almost the same as that of the polycarbonate resin and thus coextrusion molding at a high temperature that is advantageous for high precision transfer can be performed without any problem. Therefore, the shape transfer property upon melt extrusion molding can be enhanced.

A crystalline polyamide resin is preferably used as the polyamide resin since it is greatly effective in suppressing deformation of the polycarbonate resin layer upon forming grooves on the surface of the polycarbonate resin layer. Alternatively, an amorphous polyamide resin can also be used. In particular, by selecting an amorphous polyamide resin whose glass transition temperature differs from that of a polycarbonate resin forming the first layer of the laminated body (which will be described in detail below) within ±40° C., preferably within ±30° C. and more preferably within ±20° C., to form the second layer, the die temperature and the roll temperature can suitably be set.

A fine groove is formed in the surface of the optical sheet, namely, the outer surface of the first layer made from a polycarbonate resin which will be described below. More specifically, a fine grooved shape of any of a matte finish shape (light diffusion), a prism shape (light condensation) or a microlens shape (light diffusion and light condensation) is formed. In a case of a matte finish shape, an optical sheet may have, for example, Ra (arithmetic average roughness) in a range of 0.1-5.0 μm and preferably 1.0-3.0 μm. In a case of a prism shape, an optical sheet may have, for example, a V groove depth of 150 μm or less and preferably 100 μm or less with respect to the total thickness of the optical sheet of the present invention, and an apex angle of the V groove in a range of 30-150 degrees. Moreover, in a case of a microlens shape, an optical sheet may have, for example, a lens diameter of 1-100 μm and preferably 5-50 μm.

(II) Polycarbonate Resin Forming First Layer

According to the present invention, a first layer of a laminated body which will eventually become an optical sheet is formed with a polycarbonate resin. Examples of the polycarbonate resin used include aromatic polycarbonate resins and aliphatic polycarbonate resins. Among them, an aromatic polycarbonate resin is preferably used.

An aromatic polycarbonate resin is an optionally branched thermoplastic polymer or copolymer that can be obtained by reacting an aromatic dihydroxy compound or an aromatic dihydroxy compound and a small amount of a polyhydroxy compound with phosgene or carbonic acid diester.

A method for preparing an aromatic polycarbonate resin is not particularly limited, and an aromatic polycarbonate resin prepared by a conventionally known phosgene method (interfacial polymerization method) or melting method (transesterification method) can be used. When a melting method is employed, a polycarbonate resin in which the number of OH group as the terminal group is adjusted can be used.

Examples of the aromatic dihydroxy compound as a raw material include bis(hydroxyaryl)alkanes such as 2,2-bis(4-hydroxyphenyl)propane (=bisphenol A), bis(4-hydroxydiphenyl)methane, 1,1-bis(4-hydroxyphenyl)ethane, 2,2-bis(4-hydroxyphenyl)butane, 2,2-bis(4-hydroxyphenyl)octane, bisbis(4-hydroxydiphenyl)phenylmethane, 2,2-bis(4-hydroxydiphenyl-3-methylphenyl)propane, 1,1-bis(4-hydroxy-3-tertiary butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane, bis(hydroxyaryl)cycloalkanes such as 1,1-bis(4-hydroxyphenyl)cyclopentane and 1,1-bis(4-hydroxyphenyl)cyclohexane, dihydroxyldiaryl ethers such as 4,4'-dihydroxydiphenylether and 4,4'-dihydroxy-3,3'-dimethyldiphenylether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide, dihydroxydiaryl sulfones such as 4,4'-dihydroxydiphenyl sulfone and 4,4'-dihydroxy-3,3'-dimethyldiphenyl sulfone, hydroquinone, resorcinol and 4,4-dihydroxydiphenyl, and preferably include bisphenol A. In addition, a compound in which one or more tetraalkylphosphonium sulfonates are bound to the above-described aromatic dihydroxy compound may also be used.

In order to obtain a branched aromatic polycarbonate resin, the above-described aromatic dihydroxy compound is partially substituted with a branching agent, namely, a polyhydroxy compound such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenylheptene-3,1,3,5-tri(4-hydroxyphenyl)benzene or 1,1,1-tri(4-hydroxyphenyl) ethane, or a compound such as 3,3-bis(4-hydroxyaryl)oxindole (=isatinbisphenol), 5-chloroisatin, 5,7-dichloroisatin or 5-bromisatin. The amount of such compound to be used is 0.01-10 mol % and preferably 0.1-2 mol % with respect to the aromatic dihydroxy compound.

Among the aromatic polycarbonate resins mentioned above, a polycarbonate resin induced from 2,2-bis(4-hydroxyphenyl)propane, or a polycarbonate copolymer induced from 2,2-bis(4-hydroxyphenyl)propane and other aromatic dihydroxy compound is preferable. It may also be a copolymer mainly composed of a polycarbonate resin, for example, a copolymer with a polymer or an oligomer having a siloxane structure. Alternatively, two or more types of aromatic polycarbonate resins mentioned above may be used as a mixture.

In order to adjust the molecular weight of the aromatic polycarbonate resin, a monovalent aromatic hydroxy compound can be used, including, for example, m- and p-methylphenol, m- and p-propylphenol, p-tert-butylphenol and p-long-chain alkyl-substituted phenol.

In terms of extrusion moldability, strength and the like, the molecular weight of an aromatic polycarbonate resin used for the present invention is such that the viscosity average molecular weight [Mv] is 10,000-40,000 and more preferably 15,000-35,000 when converted from a solution viscosity determined at a temperature of 25° C. using methylene chloride as a solvent. By making the viscosity average molecular weight to be 15,000 or more as such, the mechanical strength is more enhanced, while by making the viscosity average molecular weight to be 35,000 or less, deterioration of fluidity is suppressed and thus the fluidity is likely to be improved, which are favorable in terms of easy molding processability.

The viscosity average molecular weight is preferably 10,000-25,000, more preferably 15,000-24,000 and particularly preferably 17,000-23,000. Alternatively, two or more types of aromatic polycarbonate resins with different viscosity average molecular weights may be mixed, in which case an aromatic polycarbonate resin whose viscosity average molecular weight does not lie in the above-mentioned preferable range may be mixed. In this case, it is favorable that the viscosity average molecular weight of the mixture is within the above-mentioned range.

The polycarbonate resin may be added with a generally used additive. Examples of such additive include an antioxidant, a coloring inhibitor, an ultraviolet absorber, a light diffusing agent, a flame retardant, a mold release agent, a lubricant, an antistatic agent and a dye/pigment. Although the content of such an additive in the polycarbonate resin is arbitrary as long as transparency of the optical sheet can be maintained, it is preferably 1% or less by mass in order to prevent roll stain or the like caused by deposition of the additive upon sheet molding.

Besides the additives, a different kind of polymer material may also be blended to the polycarbonate resin. While the different kind of polymer material that can be blended is not particularly limited as long as the transparency is maintained, it is preferably an amorphous polyester-based resin or a special acrylic resin that is compatible with the polycarbonate resin. In this case, the main component is preferably a polycarbonate resin from a standpoint of coextrusion moldability with the polyimide resin, and a preferable blending ratio (mass ratio) of [polycarbonate resin:different kind of polymer material] is 100:0 to 50:50, and more preferably 100:0 to 70:30. A blend material of the polycarbonate resin and the different kind of polymer material can be used to easily adjust the difference of the glass transition temperature from the polyamide resin to lie within a predetermined range.

Needless to say, as a method for adjusting the difference in the glass transition temperature between the polycarbonate resin and the polyamide resin to lie within a predetermined range, it is also possible to blend two or more types of (aromatic) polycarbonate resins or use two or more types of monomers to form a copolymer, as already described above.

As the polycarbonate resin, a recycled material may be used. For example, in a case where the third layer which will be described in detail below is formed of a polycarbonate resin and is not used as an optical sheet, the polycarbonate resin contained in the third layer may be a recycled material and may thereafter be utilized for forming a first layer or a third layer.

The thickness of the first layer formed of the above-described polycarbonate resin is within a range of 30-250 μm, preferably in a range of 30-200 μm and more preferably in a range of 30-150 μm.

(III) Polyamide Resin Forming Second Layer

According to the present invention, a polyamide resin is used to form the second layer of the laminated body for manufacturing an optical sheet. Herein, a "polyamide" resin refers to a polymer having an amide (—NHCO—) bond in the main chain and refers to a polyamide compound obtained by ring-opening polymerization of lactam, a polyamide compound obtained by self-condensation of w-aminocarboxylic acid, a polyamide compound obtained by condensating diamine and dicarboxylic acid, a copolymer thereof and the like.

As the polyamide resin used in an embodiment of the present invention, crystalline polyamide is preferable, while polyamide (PA) 6, polyamide (PA) 66 and the like are available as the crystalline polyamide, PA6 or the like is preferably used. Use of a polyamide resin is effective in suppressing deformation of the polycarbonate resin layer upon forming a fine groove on the surface of the laminated polycarbonate resin layer. This effect is remarkable in a case of a crystalline polyamide resin or an alloy of an amorphous polyamide resin. In addition, a crystalline polyamide resin is found to be advantageous for being inexpensive than an amorphous polyamide.

According to the present invention, an amorphous polyamide, particularly preferably an alloy of an amorphous polyamide resin can also be used as the polyamide. If the crystallinity of the polyamide resin forming the second layer is high, warpage (curl) is likely to be caused due to the difference in the volume shrinkage from that of the polycarbonate resin forming the first layer upon cooling solidification for manufacturing an optical sheet. This problem, however, can surely be solved by using an amorphous polyamide. An amorphous polyamide is a polyamide without a melting point among the polyamide resins. Examples of the amorphous polyamide include polyamides obtained by polymerizing raw material monomers having an asymmetric chemical structure among polyamide-forming dicarboxylic acids, diamines, lactams and aminocarboxylic acids.

Examples of the amorphous polyamide include copolymers containing polyamide 12 (PA12) such as PA12/MACMI (laurolactam/3,3-dimethyl-4,4-diaminocyclohexylmethane, isophthalic acid) and PA12/MACMT (laurolactam/3,3-dimethyl-4,4-diaminocyclohexylmethane, terephthalic acid), PAMACM12 (3,3-dimethyl-4,4-diaminocyclohexylmethane, dodecanedicarboxylic acid), PACM12

(1,3-bis(aminomethyl)cyclohexane, dodecanedicarboxylic acid), and PA6I/6T copolymers such as PA6I/6T and PA6I/6T/MACMI. The notations of the above-mentioned amorphous polyamides are used in accordance with JIS-K6920-1.

The amorphous polyamide is not particularly limited and may be prepared according to a conventionally known method. Commercially available amorphous polyamides may also be used, examples being PA12/MACMI (trade name: Grilamid (registered trademark) TR55 (from EMS)), PAMACM12 (trade name: Grilamid (registered trademark) TR90 (from EMS)), PAMC12 (trade name: Trogamid (registered trademark) CX (from Degussa)), PA12/MACMT (trade name: Cristamid (registered trademark) MS (from Arkema)), and PA6I/6T (trade name: Novamid (registered trademark) X21 (from Mitsubishi Engineering-Plastics Corporation)).

The polyamide resin may be added with a generally used additive. Examples of such additive include an antioxidant, a coloring inhibitor, an ultraviolet absorber, a light diffusing agent, a flame retardant, a mold release agent, a lubricant, an antistatic agent and a dye/pigment. Although the content of such an additive in the polyamide resin is arbitrary as long as transparency of the optical sheet can be maintained, it is preferably 1% or less by mass in order to prevent roll stain or the like caused by deposition of the additive upon sheet molding.

Besides the additives, a different kind of polymer material may also be blended into the polyamide resin. While the different kind of polymer material that can be blended is not particularly limited as long as the transparency is maintained, it is preferably a polyester-based resin or the like. In this case, the main component is preferably a polyamide resin, particularly a crystalline polyamide resin, from the standpoint of coextrusion moldability with the polycarbonate resin, and a preferable blending ratio (mass ratio) of [polyamide resin:different kind of polymer material] is 100:0 to 50:50, and more preferably 100:0 to 70:30. A blend material of the polyamide resin and the different kind of polymer material can be used to easily adjust the difference of the glass transition temperature from the polycarbonate resin to lie within a predetermined range.

As a method for adjusting the difference in the glass transition temperature between the polycarbonate resin and the polyamide resin to lie within a predetermined range, it is also possible to employ a method of blending multiple polyamide resins.

The thickness of the second layer formed of the above-described polyamide resin is in a range of 20-250 μm, preferably in a range of 30-150 μm and more preferably in a range of 30-100 μm.

(IV) Resin Forming Third Layer

According to the present invention, a third layer is formed in the laminated body for manufacturing an optical sheet. The third layer is formed on the other side of the first layer of the laminated body so as to sandwich the second layer with the first layer. By forming the third layer as such, shrinkage of the laminated body can be prevented. In a laminated body including only the above-described first and second layers, warpage may occur which results in molding failure since shrinkage of the polyamide resin forming the second layer is larger than that of the polycarbonate resin forming the first layer when the high temperature upon molding returns to ordinary temperature. On the other hand, by forming a third layer on the other side of the first layer with a material having small difference of shrinkage from the first layer of the laminated body, the above-described shrinkage of the second layer and the resulting warpage of the laminated body can be suppressed. Moreover, by forming a fine groove on the outer surface of the third layer like the first layer, the third layer as well as the first layer can be utilized as the optical sheet.

By using a crystalline polyamide resin as the polyamide resin forming the second layer, there are advantages in that it has a greater effect in suppressing deformation of the polycarbonate resin layer upon forming the fine grooves, and that it is inexpensive than an amorphous polyamide resin.

As a material forming the third layer, a polycarbonate resin is preferable. In particular, as a material mainly forming the third layer, a polycarbonate resin that is the same material as the polycarbonate resin contained in the first layer is preferable. In a laminated body in which the third layer is a polycarbonate resin, in particular, the same polycarbonate resin as the polycarbonate resin contained in the first layer, the difference in shrinkage between the first layer and the third layer can be minimized and warpage of the laminated body can easily be suppressed. The material that is the same as the polycarbonate resin forming the first layer comprises a polycarbonate resin that has the main components substantially in common with those forming the first layer. For example, it may comprise a polycarbonate resin that has different viscosity grade but that shares the same main components.

The third layer may be formed of a resin other than a polycarbonate resin as long as it can reduce warpage of the laminated body. For example, the third layer preferably contains a resin selected from polyvinyl chloride, polyvinylidene chloride, polylactic acid, polyurethane, polystyrene, an ABS resin, an acrylic resin, a polyacetal resin, a polyester such as polyethylene terephthalate, polybutylene terephthalate, polytrimethylene terephthalate, polyethylene naphthalate or polybutylene naphthalate, nylon, aramid, polyamide, an acrylonitrile styrene resin (AS resin) and a cyclo-olefin polymer (COP).

The thickness of the above-described third layer is in a range of 30-250 μm, preferably in a range of 30-150 μm and more preferably in a range of 30-100 μm. Here, the thickness of each of the first to third layers is not necessary the same and can be molded to have any thickness within the above-described range.

(V) Laminated Body

According to the present invention, the above-described first layer comprising a polycarbonate resin, the second layer comprising a polyamide resin and the third layer are laminated into a sheet by coextrusion molding to form a laminated body having the first to third layers.

In order to perform coextrusion molding of a polycarbonate resin and a polyamide resin, the melt viscosities of both resins need to meet as much as possible within the set temperature region for melt extrusion molding. If the difference in the melt viscosity between these resins is too large, a wavy pattern called flow mark may occur, or in the worst case, they cannot be laminated across the entire sheet width or the thickness distribution width may become too wide. Since the central value of the set temperature for melt extrusion molding of a polycarbonate resin is approximately 260° C. and the central value of the shear rate upon melt extrusion molding is approximately 100 $S^{-1}$ in general, the melt viscosity ratio of both resins at said shear rate at 260° C. is preferably in a range of 1:5 to 5:1, and more preferably in a range of 1:3 to 3:1. In a case of a polycarbonate resin, the viscosity curve changes largely in the shear rate region around 100 $S^{-1}$ and thus the choice of the material would be easy by using the melt viscosity at said shear rate as an index for judging whether or not coextrusion is possible.

Moreover, since a polyamide resin, in particular, an amorphous polyamide resin, is a highly transparent material, it is advantageous in that inspection of appearance is possible even in a state where it is laminated with a polycarbonate resin. Since a polyamide resin is a homogeneous material and molding shrinkage is uniform at any part, there is less concern about a decrease in the light transmittance caused by roughening of the interface.

In a case where a fine grooved shape is not formed on the outer surface of the third layer (i.e., when the third layer is a flat plane), the polycarbonate resin forming the third layer does not have to be transparent. Therefore, it may contain a colorant, an inorganic filler or the like as long as moderate peelable property is not impaired. A preferable amount of an inorganic filler added is, for example, 1-30% by mass.

(VI) Method for Manufacturing Optical Sheet

An optical sheet of the present invention is manufactured as follows. First, a first layer comprising a polycarbonate resin, a second layer comprising a polyamide resin and a third layer are molded into a sheet by coextrusion molding and then laminated such that the second layer is sandwiched between the first layer and the third layer, thereby forming a laminated body. This laminated body having the peelable polyamide resin layer laminated on one side of the polycarbonate resin layer is manufactured with a coextrusion molding machine as follows. Specifically, the machine is composed of an extruder for extruding a polycarbonate resin and an extruder for extruding a polyamide resin, where the approximate size of each extruder is determined according to the ratio of the layer thicknesses of the laminated body, or the like. Although the temperature condition of the extruder for the polycarbonate resin is generally 230-320° C., it is preferably set to 270-300° C. in order to increase the property of transferring a fine grooved shape. The temperature condition of the extruder for the polyamide resin can appropriately be changed according to the grade of the material used. According to the present invention, it is preferable to keep the melt viscosity of the polyamide resin to be almost the same as the melt viscosity of the polycarbonate resin. In this case, the extrusion temperature conditions of both extruders are almost equivalent and thus possible to prevent occurrence of defects upon lamination. Furthermore, in order to remove the foreign substances in the resin, a polymer filter is preferably provided on the upstream side of the die of the extruder.

As a method for laminating three types of molten resins, a known method such as a multi-manifold system or a feedblock system can be employed. In the case of a multi-manifold die, a molten resin layered and molded into a sheet in the die, and then sandwiched under pressure between a cooling/shaping roll having a fine grooved shape on its surface and a press roll so as to form a sheet-like molded product that has a fine grooved shape on either or both surfaces of the polycarbonate resin. The fine grooved shape is fixed while this sheet-like molded product is passing through the cooling/shaping roll to form a laminated body. Alternatively, a molten resin layered in a feedblock is guided to a sheet molding die such as a T-die, molded into a sheet and then sandwiched under pressure between a cooling/shaping roll having a fine grooved shape on its surface and a press roll, thereby forming a laminated body having a fine grooved shape transferred onto the outer surface of the polycarbonate resin layer. Here, the set temperature of the die is usually 250-320° C. and preferably 270-300° C. The set temperature of the cooling/shaping roll is usually 100-190° C. and preferably 110-180° C. A vertical-type roll machine or a horizontal-type roll machine can suitably be used for configuring the rolls of the sheet molding machine.

As the press roll, a rigid metal roll, an elastic metal roll, a rubber roll or the like may appropriately be used. In a case where the press roll is a rigid metal roll or an elastic metal roll, the set temperature is preferably lower by 5° C. to 30° C. than the glass transition temperature of the resin that makes contact with the roll. In a case of a rubber roll, a refrigerant may be used due to poor cooling efficiency to set the temperature to 100° C. or lower.

The thickness ratio of the polycarbonate resin layer and the polyamide resin layer can be accurately be adjusted by adjusting the discharge rate by changing the rotation number of the extruder. Furthermore, the total thickness of the multi-layer sheet can be adjusted by changing the line speed on the downstream side of the sheet molding machine (roll unit) in addition to adjusting the discharge rate on the upstream side of the sheet molding machine (extruding machine).

A cooling/shaping roll having a fine grooved structure provided on its surface can be fabricated by applying plating to an iron core roll, and then subjecting it to cutting work with a diamond cutting tool, grinding work with a grinding stone, etching work by selective corrosion or any other existing patterning technique.

While examples of the plating type include copper plating and nickel plating, nickel-phosphorus plating that is excellent in durability with high surface hardness is most preferable since high linear pressure is applied upon melt extrusion molding. Nickel-phosphorus plating may be applied by either an electroplating method or an electroless plating method. Alternatively, a special cooling/shaping roll may be used whose fine grooved shape transfer property is enhanced by delaying cooling of the molten resin by providing a ceramic layer or a low thermal conduction metal material layer as an underlayer.

Furthermore, the peel strength between the first layer formed of a polycarbonate resin and the second layer formed of a polyamide resin upon a 180-degree peel test is preferably 1 N/m or more so that no trouble such as peeling of both resin layers would not occur during molding. Although the upper limit value of the peel strength is not particularly defined, the handling property is deteriorated if the adhesiveness is too strong. Therefore, a preferable value is, for example, 100 N/m. Specifically, the peel strength between the first layer and the second layer of the optical sheet is in a range of 1-100 N/m and preferably in a range of 2-50 N/m. These peel strength values are obtained when the testing rate upon the peel test is 150 mm/min and the thickness of the sheet layer to be held by a clamp and run (peeled off) is 50-150 μm. In addition, the peel strength between the second layer formed of a polyamide resin and the third layer is also preferably within the above-mentioned range.

When a polyamide resin with high transparency is used, the whole laminated body becomes transparent and thus the appearance of the optical sheet can very easily be confirmed.

In addition, the interface between the polycarbonate resin layer and the polyamide resin layer may be made to have a matte surface. A matte surface can be acquired by blending a resin filler or a different kind of polymer material. In addition to roughening caused by physical occurrence of grooves, roughening can be promoted by locally providing difference in solidification rate or shrinkage.

A surface-shaped optical sheet of the present invention can be obtained by coextrusion molding of a polycarbonate resin and a polyamide resin, preferably a crystalline polyamide resin. Since compatibility of the polycarbonate resin and the polyamide resin is relatively high, the peel strength at the interface is moderate. Therefore, various troubles that may occur during coextrusion molding can be suppressed. Additionally, since potential heat is relatively high owing to the total thickness of the optical sheet, excessive cooling of the molten resin at the air gap region can be prevented.

Moreover, since the sheet-like molten resin is easily cooled and heat transfer from the molten resin to the roll is large when manufacturing a thin laminated body, the molten resin is rapidly solidified and thus the transfer property of the fine grooved structure is likely to be deteriorated. On the other hand, not only the second layer but also the third layer is laminated on the first layer in the present invention, and thus the temperature of the molten resin can be maintained high during the manufacturing process.

These effects of the present invention can greatly enhance the rate for transferring the fine grooved shape of the surface of the cooling/shaping roll, namely, the ratio of the average depth of the fine grooves provided on the roll surface to the average depth of the fine grooves actually formed on the optical sheet surface. Accordingly, once the polycarbonate resin layer and the polyamide resin layer are peeled off, a very thin polycarbonate resin layer having a fine and clear grooved shape at a high transfer rate, namely, a high performance optical sheet, can be obtained.

More specifically, the ratio of [transfer rate (%)/total optical sheet thickness (μm)] of the polycarbonate resin layer that eventually becomes a single-layer optical sheet is 0.4 (%/μm) or more. For example, a transfer rate of almost 100% can be realized in a polycarbonate resin layer (optical sheet) with a thickness of 250 μm, in which case the ratio of [transfer rate (%)/total optical sheet thickness (μm)] is 0.4. The ratio of [transfer rate (%)/total optical sheet thickness (μm)] is preferably 0.58 or more, more preferably 0.66 or more and particularly preferably 0.97 or more.

Furthermore, according to the present invention, the ratio value of the average groove depth (μm) of the polycarbonate resin layer that eventually becomes a single-layer optical sheet (for example, the prism height (μm) when the fine grooved shape has a prism shape) and the total thickness (μm) of the polycarbonate resin layer (single-layer optical sheet) of 0.375 or more can be realized. For example, an optical sheet having a prism height (average groove depth) of 7.5 μm and a total polycarbonate resin layer thickness of 200 μm (the ratio value of 0.0375) as well as optical sheets having a ratio value greater than that (a prism height (average groove depth) of 7.5 μm and a sheet thickness of 120 μm or less) can be manufactured. As a specific example which may show the upper limit value of the above-mentioned ratio value, an optical sheet having a prism height (average groove depth) of 25 μm and a total polycarbonate resin layer thickness of 50 μm can be manufactured. Accordingly, the ratio value of [average groove depth (μm)/total optical sheet thickness (μm)] is 0.0375 or more where the upper limit is, for example, 0.5 or less. The ratio value of [average groove depth (μm)/total optical sheet thickness (μm)] is preferably 0.05 or more, more preferably 0.075 or more and particularly preferably 0.12 or more or 0.24 or more.

A manufacture method of the present invention, in which a third layer is laminated to form a thick laminated body by coextrusion molding and the laminated body is peeled apart to obtain a single-layer optical sheet, is found to be advantageous in that an optical sheet having a transfer rate higher than that of an optical sheet manufactured by press molding can be manufactured as a continuous sheet. Specifically, although an optical sheet having a high transfer rate can be manufactured relatively easily by press molding, it is difficult to obtain the optical sheet as a continuous sheet due to restriction owing to the manufacture machine, whereas an optical sheet having a high transfer rate can easily be manufactured as a continuous sheet in a large quantity by coextrusion molding (melt extrusion molding) according to the present invention.

In some cases, a fine grooved shape is provided on the surface of the press roll to form fine grooves on the outer surfaces of both of the first layer and the third layer, thereby obtaining two optical sheets through a single molding.

Hereinafter, the present invention will be described in more detail by way of embodiments and examples, although the present invention should not be limited to these embodiments and examples.

Figure 2:
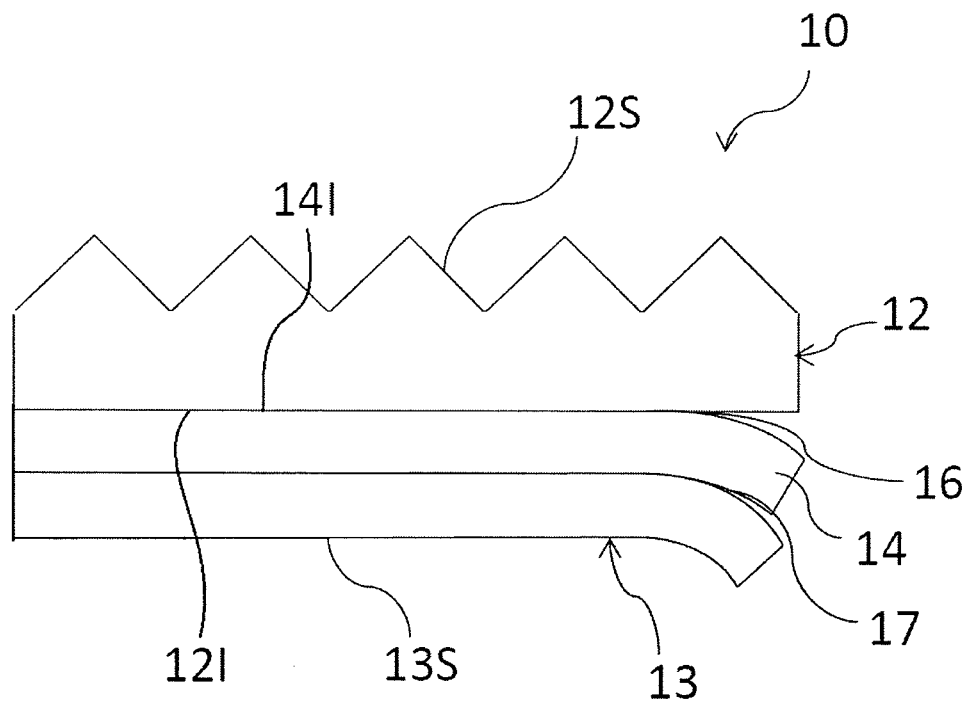
FIG. 2 A cross-sectional view for illustrating an outline of a peelable structure of the optical sheet according to the first embodiment of the present invention.

A schematic cross-sectional view of an optical sheet 10 according to a first embodiment of the present invention is shown in FIG. 1. The optical sheet 10 of the first embodiment comprises a first layer 12 and a third layer 13 formed of a polycarbonate resin, and a second layer 14 formed of a polyamide resin. Each of these layers are laminated such that they make contact with each other at flat interfaces 16 and 17. The outer surface of the first layer 12, that is, the surface 12S on the opposite side of the interface 16, is provided with a fine grooved shape which is shown in an exaggerated way in the figure. Specifically, it has a prism shape. Meanwhile, the outer surface 13S of the third layer 13 is flat. As shown in FIG. 2, the first layer 12 and the second layer 14, and the second layer 14 and the third layer 13 are peelable from each other at the interfaces 16 and 17, respectively.

Although the fine grooved shape is formed on the outer surface 12S of the first polycarbonate resin layer 12 in the optical sheet 10 of the first embodiment (see FIGS. 1 and 2), the outer surface 12S may be flat while fine grooved shapes may be formed on the inner surface 12I of the first polycarbonate resin layer 12 as well as on the surface 14I of the second polyamide resin layer 14 on the side of the first layer 12. By forming a fine grooved shape on the inner surface 12I and the surface 14I, i.e., at the interface 16, in this manner, sticking between the first layer to be used as the optical sheet 10 and the second layer can be prevented for certain.

In order to form the fine grooved shape at the interface 16 between the first layer and the second layer as described above, a crystalline polyamide resin is preferably used as the polyamide resin of the second layer. In addition, a roll with a flat surface can be used instead of a roll used for forming a fine grooved shape on the outer surface 12S which will be described in detail so as to make the outer surface 12S flat while forming a fine grooved shape at the interface 16.

Figure 3:
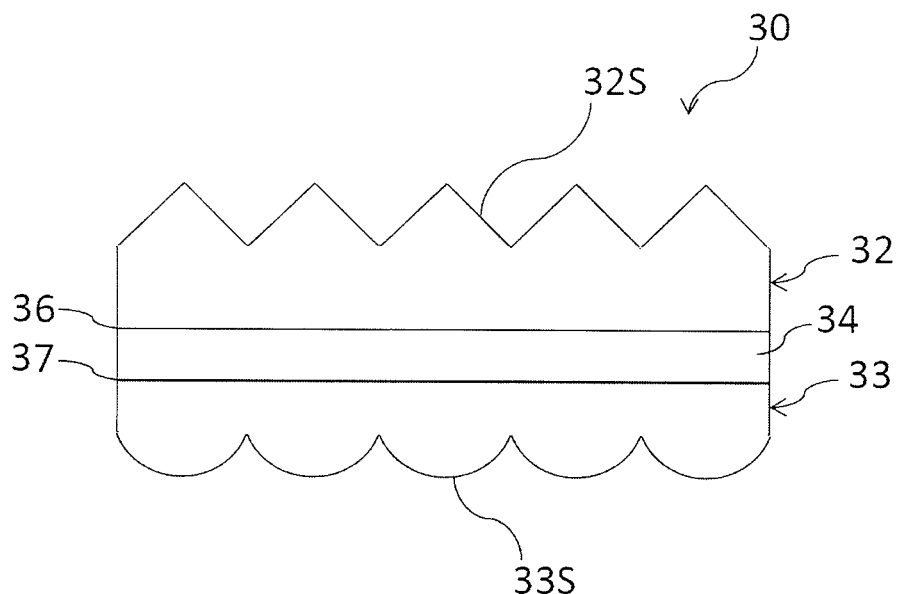
FIG. 3 A schematic cross-sectional view of an optical sheet according to a second embodiment of the present invention.

In a case of an optical sheet 30 of a second embodiment (see FIG. 3), not only a first polycarbonate resin layer 32 but also a third layer 33 have grooves on the surface. Specifically, fine grooved shapes are formed on both of the outer surface 32S of the first layer 32 and the outer surface 33S of the third layer 33. Specifically, the outer surface 32S has a prism shape while the outer surface 33S has a microlens shape. The second embodiment differs from the first embodiment in this point. As can be appreciated from FIG. 3, similar to the optical sheet 10, the first layer 32 and the second layer 34, and the second layer 34 and the third layer 33 are peelable from each other at the interfaces 36 and 37, respectively, in the optical sheet 30 of the present embodiment.

Furthermore, since the fine grooved shapes on the outer surfaces 32S and 33S of the first layer 32 and the third layer 33 can be formed through a single step by using two rolls that have fine grooved shapes on their surfaces as will be described below, two optical sheets made of the first layer 32 and the third layer 33 can efficiently be manufactured.

Figure 4:
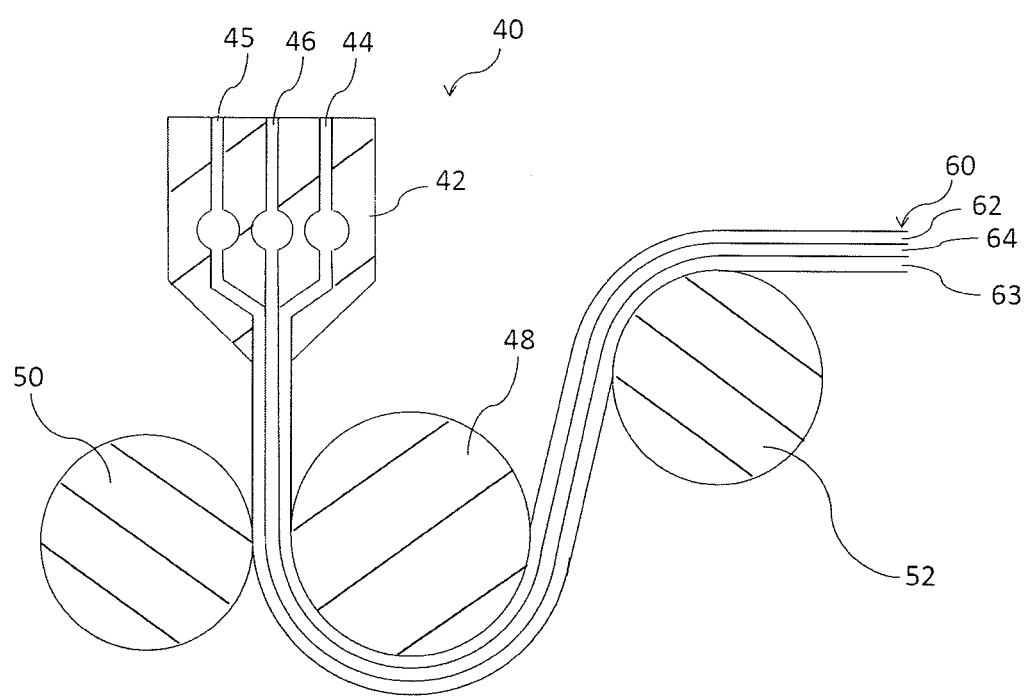
FIG. 4 A view for illustrating a method for manufacturing an optical sheet of the present invention.

Both of the above-described optical sheets 10 and 30 of the first and the second embodiments are manufactured with a coextrusion molding machine 40. An example of the machine is partially shown in FIG. 4. A first channel 44, a second channel 46 and a third channel 45 are formed in a die 42 of the coextrusion molding machine 40, where a heated polycarbonate resin is passed through the channels 44 and 45 while a polyamide resin is passed through the channel 46. The resultants sandwiched between a cooling/shaping roll 48 and a press roll 50 under pressure, thereby manufacturing an optical sheet. Here, the die 42 is a multi-manifold die and the roll 52 is a mirror surface roll.

The cooling/shaping roll 48 has a surface shape that corresponds to a fine grooved shape of the surface of the optical sheet to be manufactured. Accordingly, the fine grooved shape is formed on the surface of a first layer 62 of a laminated body 60 which is formed of a polycarbonate resin passing through the first channel 44 and thus the above-described optical sheet 10 (see FIG. 1) can be manufactured. Resins passing through the first to third channels 44-46 can appropriately be selected so as to adjust the materials of the first to third layers of the laminated body 60 to be manufactured. Alternatively, another cooling/shaping roll (not shown) can be used instead of the press roll 50 so that fine grooved shapes are formed on the outer surfaces of both of the first layer 62 and the third layer 63 of the laminated body 60, and thus the optical sheet 30 of the second embodiment (see FIG. 3) can be manufactured.

Next, examples of the present invention will be described.

Example 1

In Example 1, Iupilon S-3000N (aromatic polycarbonate; Tg: 145° C.) from Mitsubishi Engineering-Plastics Corporation was used as a polycarbonate resin while an amorphous polyamide resin Grilamid TR XE 3805 (Tg: 153° C.) from EMS was used as a polyamide resin. The amorphous polyamide resin was plasticized by a 75 mmφ vent-type single-screw extruder while the polycarbonate resin was plasticized by a 40 mmφ vent-type single-screw extruder and a 32 mmφ vent-type single-screw extruder, respectively, and laminated using a 800-mm-wide multi-manifold die (see die 42 in FIG. 4) set at 280° C. to be extruded as a sheet. The above-described laminated body was molded to make a layered structure of the polycarbonate resin I (32 mmφ vent-type single-screw extruder), the amorphous polyamide resin (75 mmφ vent-type single-screw extruder) and the polycarbonate resin II (40 mmφ vent-type single-screw extruder) sequentially from the upstream side. The sheet-like molten resin flowing out from the lip part of the die was transparent, where none of a dot-like defect such as a gel particulate, a streak-like appearance defect or the like was specially observed.

The laminated sheet-like molten resin was guided and passed through a polishing roll unit, and then the extrusion amount (the screw rotation number of the extruder) and the line speed were altered to adjust the thickness. The thicknesses of the respective resin layers were set such that the polycarbonate resin layer I was about 35 μm, the polyamide resin layer was about 190 μm and the polycarbonate resin layer II was about 75 μm, thereby obtaining a multi-layer sheet having a total thickness of about 300 μm. The line speed at this point was 3 m/min. Once the thickness was adjusted, the resultant was pressed between a 300 mmφ cooling/shaping roll set to 135° C. and a 300 mmφ elastic metal roll set to 130° C. so as to transfer a fine grooved shape on the surface of the polycarbonate resin layer II. The pressing pressure (linear pressure) of the elastic metal roll was 20 kg/cm. V grooves with an apex angle of 90° were continuously provided at a pitch of 80 μm on the surface of the cooling/shaping roll used. These V grooves were provided along the circumferential direction of the roll, and a sheet having these V grooves transferred thereon will become a prism sheet, namely, a luminance enhancement sheet (see FIG. 1). The surface shape of the molded prism sheet was measured with 3D Measuring Instrument NH-3N from Mitaka Kohki Co., Ltd. As a result, the average groove depth was 29.4 μm, and the transfer rate expressed by the ratio with respect to the depth of the V grooves (40 μm) on the cooling/shaping roll was 73%. Furthermore, a 180-degree peel test was conducted with Autograph AGS-100 from Shimadzu Corporation. As a result, the peel strength between the polycarbonate resin layer I and the polyamide resin layer was 2.7 N/m.

Comparative Example 1

In Comparative Example 1, only a polycarbonate resin Iupilon S-3000N (Tg: 145° C.) from Mitsubishi Engineering-Plastics Corporation was used to mold a prism sheet with a thickness of about 75-130 μm. The primary molding conditions were generally the same as Example 1. With a thickness of 75-100 μm, a transfer defect part called press unevenness occurred locally on the sheet, and thus failed to acquire a good product. The transfer rate of said prism sheet with a thickness of 100-130 μm was 65%.

Comparative Example 2

In Comparative Example 2, only a polycarbonate resin Iupilon S-3000N (Tg: 145° C.) from Mitsubishi Engineering-Plastics Corporation was used to mold a prism sheet having a thickness of about 300 μm. The primary molding conditions were generally the same as Example 1. The transfer rate of said prism sheet was 74%.

TABLE 1

|  | Example 1 | Comparative Example 1 | Comparative Example 2 |
| --- | --- | --- | --- |
| PC resin type | A-1 | A-1 | A-1 |
| Tg of PC resin (° C.) | 145 | 145 | 145 |
| Viscosity of PC resin (Pa · s) | 1000 | 1000 | 1000 |
| PA resin type | B-1 | None | None |
| Tg of PA resin (° C.) | 153 | — | — |
| Viscosity of PA resin (Pa · s) | 1100 | — | — |

TABLE 1-continued

|  | Example 1 | Comparative Example 1 | Comparative Example 2 |
|---|---|---|---|
| Thickness of PC resin layer II (fine grooved structure layer) (μm) | 75 | 75-100 | 100-130 | 300 |
| Average groove depth of PC resin layer II (μm) | 29.4 | — | 26 | 29.6 |
| Average groove depth (μm)/ thickness (μm) of PC resin layer II | 0.39 | — | About 0.23 | 0.1 |
| Thickness of PC resin layer I (μm) | 35 | — | — | — |
| Thickness of PA resin layer (μm) | 190 | — | — | — |
| Total thickness of laminated body (μm) | 300 | 75-100 | 100-130 | 300 |
| Die temperature (° C.) | 280 | 280 | 280 | 280 |
| Shaping roll temperature (° C.) | 135 | 135 | 135 | 135 |
| Press roll temperature (° C.) | 130 | 130 | 130 | 130 |
| Linear pressure (kg/cm) | 20 | 20 | 20 | 20 |
| Line speed (m/min) | 3 | 3 | 3 | 3 |
| Transfer rate (%) | 73 | — | 65 | 74 |
| Transfer rate (%)/Thickness of optical sheet (μm) | 0.97 | — | About 0.57 | 0.25 |
| Peel strength (N/m) | 2.7 | — | — | — |
| Note | — | (*) | — | — |

A-1: Iupilon S-3000N (Mitsubishi Engineering-Plastics Corporation)
B-1: Grilamid TR XE3805 (EMS)
(*) Failed to obtain good product due to press unevenness As can be appreciated from the results in Example 1 and Comparative Examples 1-2 described above, coextrusion molding of a combination of a polycarbonate resin and a polyamide resin was capable of molding an optical sheet at a high transfer rate of a fine grooved shape and at a high average groove depth (μm) ratio to the thickness of the PC resin layer II in Example 1 even though the thickness of the eventual sheet after the peeling, i.e., the PC resin layer II, was thin. More specifically, since the transfer rate was 73%, the average groove depth was 29.4 μm and the thickness of the PC resin layer II was 75 (μm) as described above, the value of [transfer rate (%)/thickness of optical sheet (μm)] was 0.97 (%/μm), and the ratio of [average groove depth of optical sheet (μm)/thickness of optical sheet (μm)] was 0.39. Accordingly, the optical sheet of Example 1 that was made thin and that had high transfer rate ratio and average groove depth ratio to the thickness of the optical sheet can contribute to space saving of various display devices into which it is incorporated.

On the other hand, Comparative Example 1 had a problem of low transfer rate. This problem seemed to be caused because a polyamide resin layer was not formed and the thickness of the laminated body upon coextrusion molding was thinner than that of Example 1. Although there was no problem in the transfer rate in Comparative Example 2, the sheet was too thick and the transfer rate ratio and the average groove depth ratio to the total thickness were low, and thus it cannot be used in a wide range of applications as an optical sheet.

Example 2

In Example 2, sheet forming was performed in exactly the same manner as Example 1 except that: the grade of the polycarbonate resin was changed to Iupilon H-4000N from Mitsubishi Engineering-Plastics Corporation (a bisphenol A aromatic polycarbonate obtained by polymerizing bisphenol A and phosgene through interfacial polycondensation, with a viscosity average molecular weight [Mv] of about 15000 and Tg of 140° C.); the type of the polyamide resin was changed to a polyamide resin Grivory G-21 from EMS (an amorphous polyamide resin, a mixture of Nylon (registered trademark) 6T (hexamethylene diamine+terephthalic acid) and Nylon (registered trademark) 6I (hexamethylene diamine+isophthalic acid), and made amorphous owing to an increase in the randomness of the molecular structure of crystalline PA). Tg: 125° C.); the thickness of the polycarbonate resin layer I was changed to 75 μm; the thickness of the polyamide resin layer was changed to about 150 μm; and the metal pressing/cooling roll was changed to a shaping roll. A multi-layer sheet with a very good level of appearance was obtained without causing trouble or the like upon molding. Here, the surface of the pressing/shaping roll used was provided with a matte finish shape having a surface roughness Rz of 15-17 μm. The matte finish shape was provided on the entire surface of the roll, and was transferred onto the surface of the polycarbonate resin layer II. As a result, the resulting sheet became a matte sheet, namely, a light diffusing sheet. In addition, the polycarbonate resin layer I having V grooves transferred thereon like Example 1 became a prism sheet. The haze value of the molded matte sheet measured with a haze meter HM-150 from Murakami Color Research Laboratory was 50.3%. Furthermore, the resulting matte sheet had a transfer rate of 89%, an average groove depth of about 14.2 μm, and a peel strength between the polycarbonate resin layer and the polyamide resin layer of 3.1 N/m.

Comparative Example 3

In Comparative Example 3, only a polycarbonate resin Iupilon H-4000N (Tg: 140° C.) from Mitsubishi Engineering-Plastics Corporation was used to mold a prism sheet with a thickness of about 75-130 μm. The press roll was changed to an elastic metal roll like Example 1. Other primary molding conditions were generally the same as Example 2. Similar to Comparative Example 1, with a thickness of 75-100 μm, a transfer defect part called press unevenness occurred locally on the sheet, and thus failed to acquire a good product. The transfer rate of said prism sheet with a thickness of 100-130 μm was 78%.

Comparative Example 4

In Comparative Example 4, only a polycarbonate resin Iupilon H-4000N (Tg: 140° C.) from Mitsubishi Engineering-Plastics Corporation was used to mold a light diffusing sheet with a thickness of about 75-130 μm. The shaping roll was changed to a prism roll with a matte finish shape having a surface roughness Rz of 15-17. Other primary molding conditions were generally the same as Example 2. Similar to Comparative Examples 1 and 3, with a thickness of 75-100 μm, a transfer defect part called press unevenness occurred locally on the sheet, and thus failed to acquire a good product. The haze value of said light diffusing sheet with a thickness of 100-130 μm was 49.4%.

optical sheet (μm)/thickness of optical sheet (μm)] was 0.19. Moreover, by making the both of the cooling rolls used for sandwiching a sheet under pressure into shaping rolls having fine grooved shapes, two optical sheets can be obtained through a single molding.

Example 3

In Example 3, a crystalline polyamide resin UBE Nylon 1030B from Ube Industries, Ltd. was used as the polyamide resin to mold a prism sheet with a thickness of about 75 μm. The primary molding conditions were generally the same as Example 1. The transfer rate of this prism sheet was 74%.

Example 4

In Example 4, a rubber roll was used as the press roll to mold a prism sheet with a thickness of about 75 μm. The primary molding conditions were generally the same as Example 2. The transfer rate of this prism sheet was 60%, which was lower than those in other examples but generally good results were obtained.

TABLE 2

|  | Example 2 | Comparative Example 3 | | Comparative Example 4 | |
| --- | --- | --- | --- | --- | --- |
| PC resin type | A-2 | A-2 | | A-2 | |
| Tg of PC resin (° C.) | 140 | 140 | | 140 | |
| Viscosity of PC resin (Pa · s) | 300 | 300 | | 300 | |
| PA resin type | B-2 | None | | None | |
| Tg of PA resin (° C.) | 125 | — | | — | |
| Viscosity of PA resin (Pa · s) | 280 | — | | — | |
| Thickness of PC resin layer II (μm) | 75 | 75-100 | 100-130 | 75-100 | 100-130 |
| Average groove depth of PC resin layer II (μm) | 14.2 | — | 12.5 | — | — |
| Average groove depth (μm)/ thickness (μm) of PC resin layer II | 0.19 | — | 0.11 | — | — |
| Thickness of PC resin layer I (μm) | 75 | — | — | — | — |
| Thickness of PA resin layer (μm) | 150 | — | — | — | — |
| Total thickness of laminated body (μm) | 300 | 75-100 | 100-130 | 75-100 | 100-130 |
| Die temperature (° C.) | 280 | 280 | 280 | 280 | 280 |
| Shaping roll temperature (° C.) | 135 | 135 | 135 | 135 | 135 |
| Press roll temperature (° C.) | 130 | 130 | 130 | 130 | 130 |
| Linear pressure (kg/cm) | 20 | 20 | 20 | 20 | 20 |
| Line speed (m/min) | 3 | 3 | 3 | 3 | 3 |
| Transfer rate (%) | 89 | — | 78 | — | — |
| Transfer rate (%)/ Thickness of optical sheet (μm) | 1.18 | — | — | — | — |
| Haze value (%) | 50.4 | — | — | — | 49.4 |
| Peel strength (N/m) | 2.7 | — | — | — | — |
| Note | — | (*) | — | (*) | — |

A-2: Iupilon H-4000N (Mitsubishi Engineering-Plastics Corporation)
B-2: Grivory G-21 (EMS)
(*) Failed to obtain good product due to press unevenness As can be appreciated from the results in Example 2 and Comparative Examples 3 and 4 described above, coextrusion molding of a combination of a polycarbonate resin and an amorphous polyamide resin was capable of molding a sheet at a high transfer rate of a fine grooved shape and at a high average groove depth (μm) ratio to the thickness of the PC resin layers I and II even though the thickness was thin. More specifically, since the transfer rate was 89%, the average groove depth was 14.2 μm and the thickness of the PC resin layers I and II was 75 (μm) as described above, the value of [transfer rate (%)/thickness of optical sheet (μm)] was 1.18 (%/μm), and the ratio of [average groove depth of Comparative Example 5

In Comparative Example 5, Polypropylene Homopolymer F113G from Prime Polymer Co., Ltd. was used (see "C" in Table 3) as a resin of the second layer instead of a polyamide to mold a prism sheet with a thickness of about 75 μm. Other than the type of the resin of the second layer, the primary molding conditions were generally the same as Example 1. Molding failures such as a defect in resin lamination and sticking onto the shaping roll occurred upon molding the sheet and thus failed to acquire a good product.

TABLE 3

|  | Example 3 | Example 4 | Comparative Example 5 |
|---|---|---|---|
| PC resin type | A-1 | A-2 | A-1 |
| Tg of PC resin (° C.) | 145 | 140 | 145 |
| Viscosity of PC resin (Pa·s) | 1000 | 300 | 1000 |
| PA resin type | B-3 | B-2 | C |
| Tg of PA resin (° C.) | — | 125 | — |
| Viscosity of PA resin (Pa·s) | 530 | 280 | 480 |
| Thickness of PC resin layer II (fine grooved structure layer) (μm) | 75 | 75 | 75 |
| Average groove depth of PC resin layer II (μm) | 29.6 | 9.6 | — |
| Average groove depth (μm)/ thickness (μm) of PC resin layer II | 0.39 | 0.13 | — |
| Thickness of PC resin layer I (μm) | 35 | 35 | 35 |
| Thickness of PA resin layer (μm) | 190 | 190 | 190 |
| Total thickness of laminated body (μm) | 300 | 300 | 300 |
| Die temperature (° C.) | 280 | 280 | 280 |
| Shaping roll temperature (° C.) | 135 | 135 | 135 |
| Press roll temperature (° C.) | 130 | 50 | 130 |
| Linear pressure (kg/cm) | 20 | 20 | 20 |
| Line speed (m/min) | 3 | 3 | 3 |
| Transfer rate (%) | 74 | 60 | — |
| Transfer rate (%)/ Thickness of optical sheet (μm) | 0.99 | 0.8 | — |
| Peel strength (N/m) | 3.4 | 2 | — |
| Note | — | (*1) | (*2) |

A-1: Iupilon S-3000N (Mitsubishi Engineering-Plastics Corporation)
A-2: Iupilon H-4000N (Mitsubishi Engineering-Plastics Corporation)
B-2: Grivory G-21 (amorphous polyamide resin from EMS)
B-3: UBE Nylon 1030B (crystalline polyamide resin from UBE Industries)
C: Polypropylene homopolymer F113G (Prime Polypro: polypropylene resin was used instead of polyamide resin)
(*1) Rubber roll was used as press roll
(*2) Failed to obtain good product due to molding failure The results in Example 3 described above showed that even when a crystalline polyamide resin was used as a resin of the second layer instead of the amorphous polyamide resin used in Examples 1 and 2, good results, i.e., high transfer rate and else, were realized.

Moreover, in Example 4, an amorphous polyamide resin was combined with a polycarbonate resin like Examples 1 and 2, but a rubber roll was used instead of a metal roll upon coextrusion molding. As a result, the transfer rate was 60%. Although this transfer rate is generally of a good level, it was lower than other examples. Therefore, use of a metal roll was confirmed to be particularly preferable for sandwiching (pressing) a resin layer under pressure upon manufacturing a sheet of a laminated body.

In Comparative Example 5, a polyurethane resin was used instead of a polyamide resin to form the second layer, which did not result a good product due to molding failure. Accordingly, use of an amorphous or crystalline polyamide resin was confirmed to be preferable as a material of the second layer.

The invention claimed is:

1. An optical sheet obtained by laminating a first layer comprising a polycarbonate resin, a second layer comprising a polyamide resin and a third layer by coextrusion molding, wherein:
   the second layer is laminated between the first layer and the third layer;
   the first layer and the second layer, and the second layer and the third layer are peelable at their interfaces, respectively; and
   a fine grooved shape is formed on the outer surface of the first layer.

2. The optical sheet according to claim 1, wherein the third layer comprises a polycarbonate resin.

3. The optical sheet according to claim 2, wherein the first layer and the third layer are formed of the same material.

4. The optical sheet according to claim 1, wherein a fine grooved shape is also formed on the outer surface of the third layer as well as the outer surface of the first layer.

5. The optical sheet according to claim 1, wherein a fine grooved shape is formed at the interface between the first layer and the second layer and/or the interface between the second layer and the third layer.

6. The optical sheet according to claim 1, wherein the thickness of the first layer is in a range of 30-250 μm.

7. The optical sheet according to claim 1, wherein the polyamide resin contained in the second layer is a crystalline polyamide resin.

8. The optical sheet according to claim 1, wherein the polyamide resin contained in the second layer is an amorphous polyamide resin, and
   the difference between the glass transition temperature of the polycarbonate resin contained in the first layer and the glass transition temperature of the amorphous polyamide resin contained in the second layer is within a range of ±40° C.

9. The optical sheet according to claim 1, wherein the melt viscosity ratio of the polycarbonate resin contained in the first layer and the polyamide resin contained in the second layer at 260° C. is in a range of 1:5 to 5:1 at a shear rate of 100 s$^{-1}$.

10. The optical sheet according to claim 1, wherein the peel strength between the first layer and the second layer according to a 180-degree peel test, and/or the peel strength between the third layer and the second layer according to a 180-degree peel test is in a range of 1-100 N/m when the testing rate is 150 mm/min and the thickness of the sheet layer held by a clamp and run is 50-150 μm.

11. The optical sheet according to claim 1, wherein the fine grooved shape is any one of a matte finish shape, a prism shape and a microlens shape.

12. The optical sheet according to claim 1, wherein the third layer comprises a resin selected from polyethylene, polyvinyl chloride, polyvinylidene chloride, polylactic acid, polypropylene, polycarbonate, polytetrafluoroethylene, polyurethane, polystyrene, an ABS resin, an acrylic resin, a polyacetal resin, a polyester, nylon, aramid, polyamide, an acrylonitrile styrene resin (AS resin) and a cyclo-olefin polymer (COP).

13. A method for manufacturing an optical sheet comprising a step of making a first layer comprising a polycarbonate resin, a second layer comprising a polyamide resin and a third layer into a sheet by coextrusion molding such that the second layer is laminated between the first layer and the third layer,
   wherein a fine grooved shape is provided onto the outer surface of the first layer by sandwiching the laminated body of the three layers which are the first layer, the second layer and the third layer, under pressure between a cooling/shaping roll having the fine grooved structure on its surface and a press roll.

14. The method for manufacturing an optical sheet according to claim 13, wherein the press roll is a rigid metal roll or an elastic metal roll.

15. A single-layer optical sheet comprising a polycarbonate resin, wherein a fine grooved shape is formed on at least one outer surface, the ratio of (average groove depth (μm) of the optical sheet)/(thickness of the optical sheet (μm)) is 0.0375 to 0.5, the thickness of optical sheet is 1-120 μm, and the single-layer optical sheet is manufactured by the claim 13.

\* \* \* \* \*